(12) United States Patent
Dietrich et al.

(10) Patent No.: US 9,272,220 B2
(45) Date of Patent: *Mar. 1, 2016

(54) SYSTEM AND METHOD FOR IMPROVING THE GRAPHICS PERFORMANCE OF HOSTED APPLICATIONS

(71) Applicant: Sony Computer Entertainment America LLC, San Mateo, CA (US)

(72) Inventors: Douglas Sim Dietrich, Los Gatso, CA (US); Nico Benitez, San Francisco, CA (US); Timothy Cotter, Sunnyvale, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/466,746

(22) Filed: Aug. 22, 2014

(65) Prior Publication Data

US 2014/0364223 A1      Dec. 11, 2014

Related U.S. Application Data

(63) Continuation of application No. 13/232,963, filed on Sep. 14, 2011, now Pat. No. 8,840,477, which is a continuation-in-part of application No. 12/538,077, filed on Aug. 7, 2009, now Pat. No. 9,138,644, and a (Continued)

(51) Int. Cl.
*A63F 13/53*   (2014.01)
*H04N 21/234*  (2011.01)
*H04N 21/845*  (2011.01)

(Continued)

(52) U.S. Cl.
CPC .............. *A63F 13/53* (2014.09); *A63F 13/352* (2014.09); *A63F 13/355* (2014.09); *H04N 21/23406* (2013.01); *H04N 21/8458* (2013.01);

(Continued)

(58) Field of Classification Search
CPC ......................................................... G06F 1/00
USPC .......................................................... 463/42
See application file for complete search history.

(56) References Cited

U.S. PATENT DOCUMENTS 5,038,297 A    8/1991   Hannah ......................... 345/422
6,356,288 B1   3/2002   Freeman et al.

(Continued)

OTHER PUBLICATIONS

IDS and characterization of references submitted by Inventor in related applications, 7 pages, May 24, 2013.

(Continued)

*Primary Examiner* — Paul A D'Agostino
*Assistant Examiner* — Ankit Doshi
(74) *Attorney, Agent, or Firm* — Martine Penilla Group, LLP (57) ABSTRACT

An application/game server comprising a central processing unit to process application/video game program code and a graphics processing unit (GPU) to process graphics commands and generate a series of video frames for the application/video game; one or more back buffers to store video frames as the video frames are being created in response to the execution of the graphics commands; a front buffer-outputting the video frame for display one scan line at a time at a designated scan out frequency, a subset of scan lines stored in the front buffer being associated with a vertical blanking interval (VBI); and a frame processing module to begin copying a newly completed frame from the back buffer to the front buffer before the video data for a prior video frame stored in the front buffer has not been fully scanned out.

32 Claims, 9 Drawing Sheets

Related U.S. Application Data continuation-in-part of application No. 12/359,150, filed on Jan. 23, 2009, now Pat. No. 9,084,936, which is a continuation of application No. 11/999,475, filed on Dec. 5, 2007, now Pat. No. 9,108,107, which is a continuation-in-part of application No. 10/315,460, filed on Dec. 10, 2002, now Pat. No. 7,849,491.

(60) Provisional application No. 61/210,888, filed on Mar. 23, 2009.

(51) Int. Cl.
*A63F 13/355* (2014.01)
*A63F 13/352* (2014.01)
*G06F 1/00* (2006.01)

(52) U.S. Cl.
CPC ..... *A63F2300/402* (2013.01); *A63F 2300/572* (2013.01); *G06F 1/00* (2013.01)

(56) References Cited

U.S. PATENT DOCUMENTS

| | | | |
|---|---|---|---|
| 6,590,572 | B1 | 7/2003 | Hoffert et al. ............. 345/213 |
| 7,089,319 | B2 | 8/2006 | Lysenko et al. |
| 7,446,774 | B1 | 11/2008 | MacInnis et al. ............ 345/519 |
| 7,587,520 | B1 | 9/2009 | Kent et al. |
| 2002/0128065 | A1 | 9/2002 | Chung et al. ............. 463/42 |
| 2003/0074445 | A1 | 4/2003 | Roach et al. |
| 2003/0156650 | A1 | 8/2003 | Campisano et al. |
| 2004/0054589 | A1 | 3/2004 | Nicholas et al. ............ 705/14 |
| 2004/0054689 | A1 | 3/2004 | Salmonsen |
| 2004/0221143 | A1 | 11/2004 | Wise et al. |
| 2006/0061592 | A1 | 3/2006 | Akenine-Moller |
| 2006/0111186 | A1 | 5/2006 | Hattori |
| 2007/0165035 | A1* | 7/2007 | Duluk et al. ............. 345/506 |
| 2007/0242077 | A1 | 10/2007 | Danan |
| 2009/0249393 | A1* | 10/2009 | Shelton et al. ............. 725/39 |

OTHER PUBLICATIONS

Office Action from U.S. Appl. No. 13/232,971, mailed Aug. 15, 2012, 14 pages.
Non-Final Office Action from U.S. Appl. No. 13/232,979 mailed Sep. 12, 2013, 16 pages.
Office Action from U.S. Appl. No. 13/232,985 mailed Mar. 27, 2013, 7 pages.
Notice of Allowance from U.S. Appl. No. 13/232,985 mailed Jan. 17, 2014, 9 pages.
Notice of Allowance from U.S. Appl. No. 13/232,979, mailed Jan. 31, 2014, 13 pages.
Final Office Action from U.S. Appl. No. 13/232,979, mailed Apr. 10, 2013, 17 pages.
Office Action from U.S. Appl. No. 13/232,971 mailed May 13, 2013, 14 pages.
Notice of Allowance from U.S. Appl. No. 13/232,971 mailed Jan. 30, 2014, 10 pages.
Frauenfelder, M., "G-Cluster Makes Games to Go", The Feature: It's All About the Mobile Internet, http://www.thefeaturearchives.com/13267.html, 3 pages, 2001.
Office Action from U.S. Appl. No. 13/232,979 mailed Aug. 16, 2012, 16 pages.
Office Action from U.S. Appl. No. 13/232,971 mailed Aug. 15, 2012, 14 pages.
International Search Report and Written Opinion from counterpart Patent Cooperation Treaty Application No. PCT/US12/55239 mailed Nov. 23, 2012, 9 pages.
Office Action from U.S. Appl. No. 13/232,963 mailed Jul. 24, 2012, 11 pages.
Office Action from U.S. Appl. No. 13/232,963 mailed Mar. 1, 2013, 10 pages.
Notice of Allowance Action from U.S. Appl. No. 13/232,963 mailed Jan. 16, 2014, 10 pages.
Notice of Allowance from U.S. Appl. No. 13/232,985, mailed May 8, 2014, 13 pages.
Notice of Allowance from U.S. Appl. No. 13/232,963, mailed May 19, 2014, 9 pages.
Notice of Allowance from U.S. Appl. No. 13/232,971, mailed May 22, 2014, 11 pages.
Notice of Allowance from U.S. Appl. No. 13/232,979, mailed May 22, 2014, 10 pages.
Notification Concerning Transmittal of International Preliminary Report on Patentability from counterpart PCT Application No. PCT/US12/55239 mailed Mar. 27, 2014, 7 pages.
Office Action from U.S. Appl. No. 13/789,621 mailed Aug. 13, 2014, 11 pages.

* cited by examiner

SYSTEM AND METHOD FOR IMPROVING THE GRAPHICS PERFORMANCE OF HOSTED APPLICATIONS

CROSS-REFERENCE TO RELATED APPLICATIONS

This application is a Continuation of U.S. application Ser. No. 13/232,963, filed Sep. 14, 2011, entitled, "System And Method For Improving The Graphics Performance Of Hosted Applications", which is a Continuation-in-Part (CIP) of U.S. patent application Ser. No. 12/538,077, filed Aug. 7, 2009, entitled SYSTEM AND METHOD FOR ACCELERATED MACHINE SWITCHING, which claims the benefit of U.S. Provisional Application Ser. No. 61/210,888, filed Mar. 23, 2009, and is a Continuation-in-Part (CIP) application of Ser. No. 12/359,150, filed Jan. 23, 2009, which is a Continuation of Ser. No. 11/999,475, filed Dec. 5, 2007, which is a Continuation-in-Part (CIP) of application Ser. No. 10/315,460, filed Dec. 10, 2002, entitled, "APPARATUS AND METHOD FOR WIRELESS VIDEO GAMING", now U.S. Pat. No. 7,849,491, which is assigned to the assignee of the present Continuation application.

TECHNICAL FIELD

The present disclosure relates generally to the field of data processing systems and particularly to a system and method for improving the graphics performance of hosted applications.

BACKGROUND

For low latency applications such as video games, it is critical that graphics operations proceed as efficiently as possible. However, attempts to speed the graphics rendering process may result in undesirable visual artifacts such as "tearing" in which information from two or more different frames is shown on a display device in a single screen draw. The embodiments of the invention described below provide a variety of techniques for improving the efficiency of graphics rendering while at the same time reducing these undesirable visual artifacts.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

The assignee of the present application has developed an online video gaming and application hosting system. Certain embodiments of this system are described, for example, in U.S. patent application Ser. No. 12/538,077, filed Aug. 7, 2009, entitled SYSTEM AND METHOD FOR ACCELERATED MACHINE SWITCHING (hereinafter '077 application) which claims priority to U.S. Provisional Application Ser. No. 61/210,888, filed, Mar. 23, 2009, and is a continuation-in-part (CIP) application of Ser. No. 10/315,460 filed Dec. 10, 2002 entitled, "APPARATUS AND METHOD FOR WIRELESS VIDEO GAMING", which is assigned to the assignee of the present CIP application. These applications are sometimes referred to as the "co-pending applications" and are incorporated herein by reference. A brief description of certain pertinent aspects of the online video game and application hosting system described in the co-pending applications will now be provided, following by a detailed description of a virtualization and encryption system and method for hosting applications.

An Exemplary Online Video Game and Application Hosting System

Figure 1:
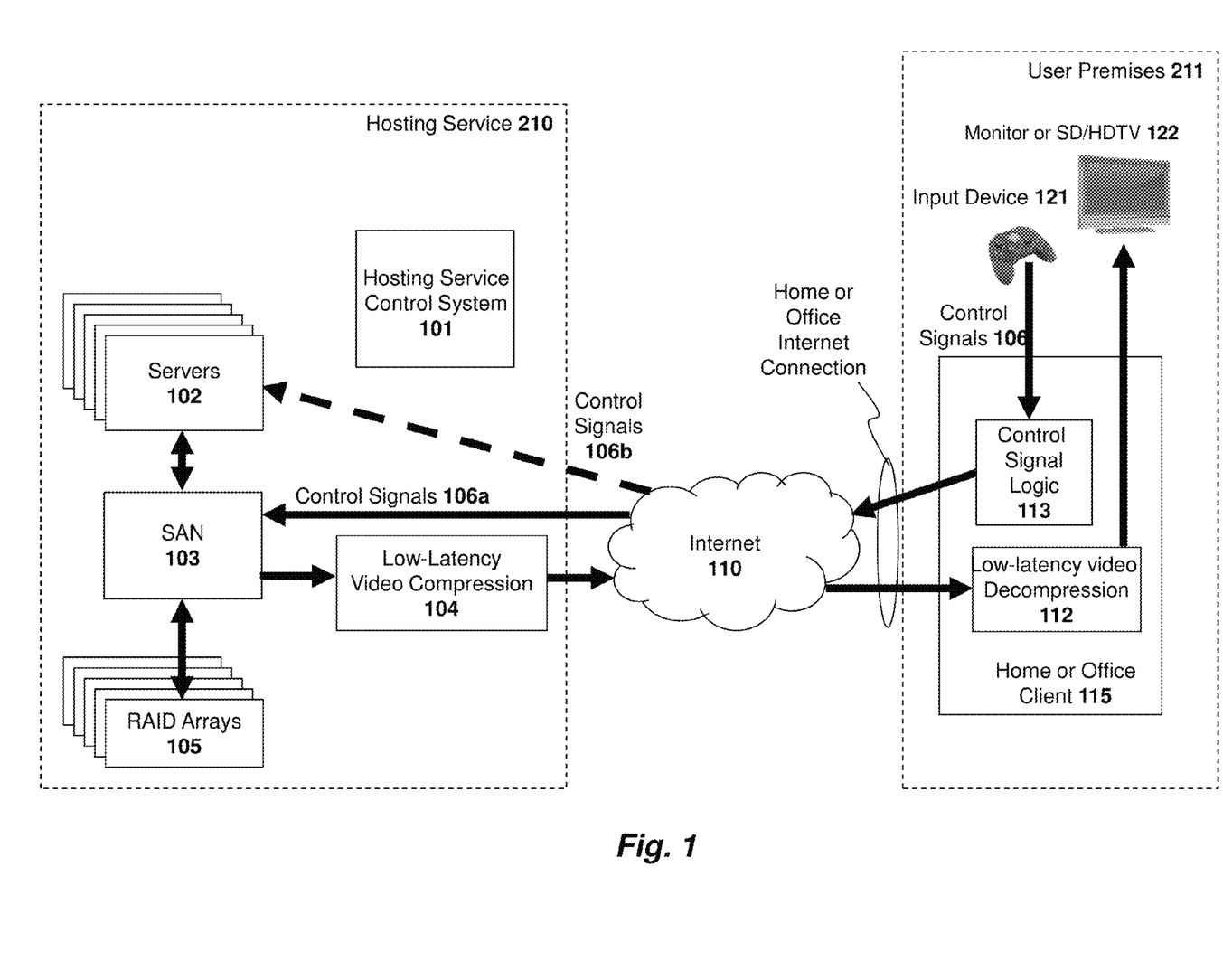
FIG. 1 illustrates a system architecture for executing online video games according to one embodiment of the invention.

FIG. 1 illustrates one embodiment of a video game/application Hosting Service 210 described in the co-pending applications. The Hosting Service 210 hosts applications running on Servers 102, that accept input from an Input device 121, received by Home or Office Client 115, and sent through the Internet 110 to Hosting Service 210. The Servers 102 are responsive to the input, and update their video and audio output accordingly which is compressed through Low-Latency Video Compression 104. The compressed video is then streamed through the Internet 110 to be decompressed by the Home or Office Client 115, and then displayed on Monitor or SD/HDTV 122. This system is an low-latency streaming interactive video system as more thoroughly described in the aforementioned "co-pending applications."

Figure 2:
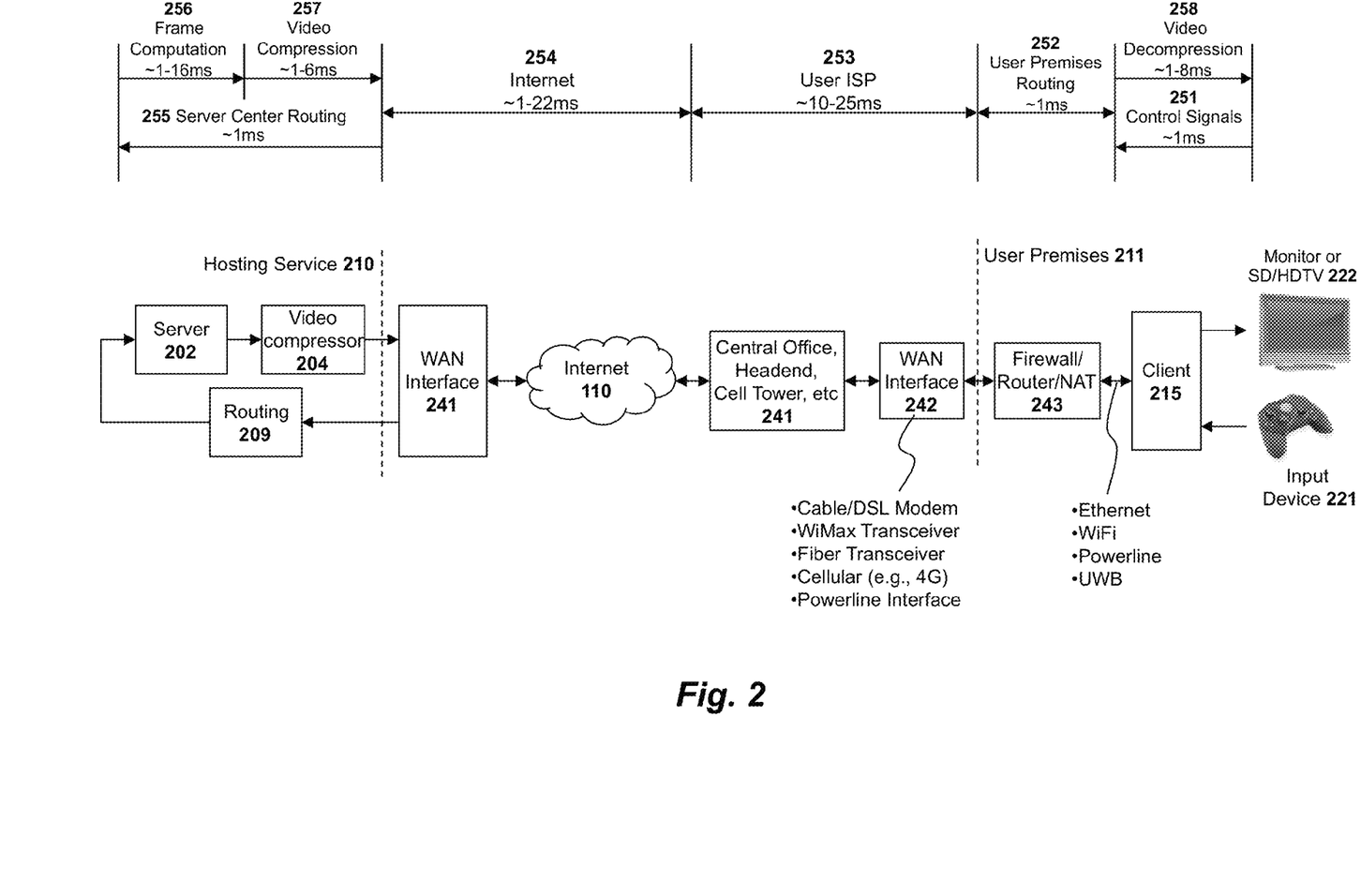
FIG. 2 illustrates different communication channels over which an online video game may be played in accordance with one embodiment of the invention.

As shown in FIG. 2, the network connection between the Hosting Service 210 Home and Office Client 215 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. Any of these client devices may have their own user input devices (e.g., keyboards, buttons, touch screens, track pads or inertial sensors, position sensors, wands, video capture cameras and/or motion-tracking cameras, etc.), or they may use external input devices 221 (e.g., keyboards, mice, game controllers, inertial sensors, position senor, wands, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client device 215 receives control signals 106 from input device 221 from the user, and then it transmits the controller input through the Internet 110 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 110. The home or office client device then decodes the compressed video stream and renders the decompressed video images on a monitor or TV. Consequently, the computing and graphical hardware requirements of the client device 215 are significantly reduced. The client 215 only needs to have the processing power to forward the input device 221 control signals 406 through the Internet 110 and decode and decompress a compressed video stream received from the Internet 110, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices, dedicated chips can also perform video decompression for such standards in real-time at far lower cost and with far less power consumption than a general-purpose CPU such as would be required for a modern PC. Notably, to perform the function of forwarding controller input and decompressing video, home client devices 215 do not require any specialized graphics processing units (GPUs), optical drive or hard drives.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 215 since its processing requirements will remain constant for a display resolution and frame rate with a given video decompression algorithm. Thus, the hardware limitations and compatibility issues seen today do not exist in the system illustrated in FIG. 1.

Further, because the game and application software executes only in servers in the hosting service 210, there never is a copy of the game or application software (either in the form of physical optical media such as a DVD-ROM, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be use by a game or applications software being pirated. Indeed, if specialized servers are required (e.g., requiring very expensive, large or noisy equipment) to play the game or application software that are not practical for home or office use, then even if a pirated copy of the game or application software were obtained, it would not be operable in the home or office.

In one embodiment, the hosting service 210 provides software development tools to the game or application software developers (which refers generally to software development companies, game or movie studios, or game or applications software publishers) which design video games so that they may design games capable of being executed on the hosting service 210. Such tools allow developers to exploit features of the hosting service that would not normally be available in a standalone PC or game console (e.g., fast access to very large databases of complex geometry ("geometry" unless otherwise qualified shall be used herein to refer to polygons, textures, rigging, lighting, behaviors and other components and parameters that define 3D datasets)).

Different business models are possible under this architecture. Under one model, the hosting service 210 collects a subscription fee from the end user and pays a royalty to the developers. In an alternate implementation, the developers collect a subscription fee directly from the user and pays the hosting service 210 for hosting the game or application content. These underlying principles are not limited to any particular business model for providing online gaming or application hosting.

Figure 3:
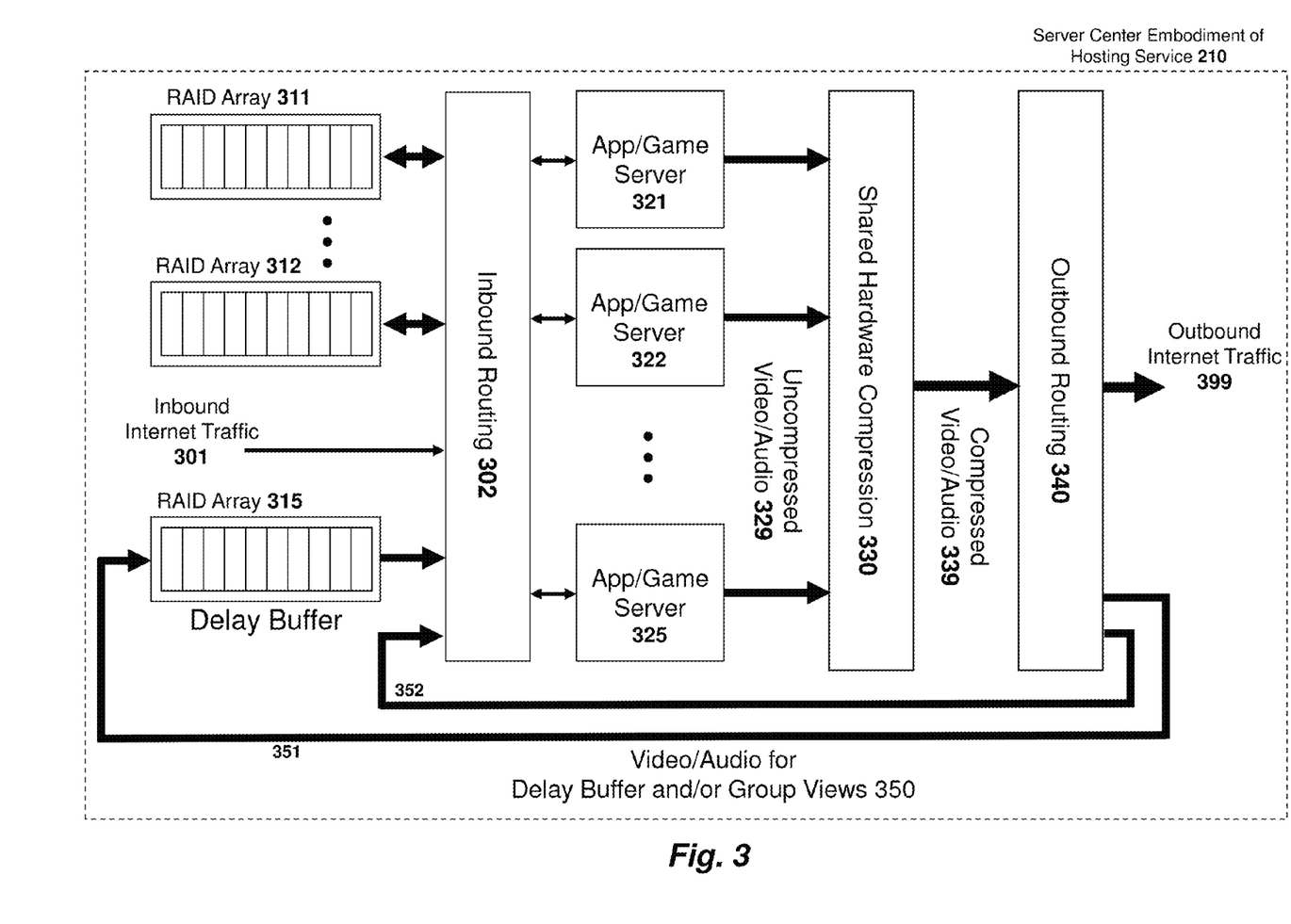
FIG. 3 illustrates one embodiment of a system architecture for compressing audio/video generated by a video game.

FIG. 3 illustrates an embodiment of components of a server center for hosting service 210 utilized in the following feature descriptions. Inbound internet traffic 301 from user clients 115 is directed to inbound routing 302. Typically, inbound internet traffic 301 will enter the server center via a high-speed fiber optic connection to the Internet, but any network connection means of adequate bandwidth, reliability and low latency will suffice. Inbound routing 302 is a system of network (the network can be implemented as an Ethernet network, a fiber channel network, or through any other transport means) switches and routing servers supporting the switches which takes the arriving packets and routes each packet to the appropriate application/game ("app/game") server 321-325. In one embodiment, a packet which is delivered to a particular app/game server represents a subset of the data received from the client and/or may be translated/changed by other components (e.g., networking components such as gateways and routers) within the data center. In some cases, packets will be routed to more than one server 321-325 at a time, for example, if a game or application is running on multiple servers at once in parallel. RAID arrays 311-312 are connected to the inbound routing network 302, such that the app/game servers 321-325 can read and write to the RAID arrays 311-312. Further, a RAID array 315 (which may be implemented as multiple RAID arrays) is also connected to the inbound routing 302 and data from RAID array 315 can be read from app/game servers 321-325. The inbound routing 302 may be implemented in a wide range of prior art network architectures, including a tree structure of switches, with the inbound internet traffic 301 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 321-325 may each have multiple network connections to the inbound routing 302. For example, a server 321-325 may have a network connection to a subnet attached to RAID Arrays 311-312 and another network connection to a subnet attached to other devices.

The app/game servers 321-325 may all be configured the same, some differently, or all differently, as previously described in relation to servers 102 in the embodiment illustrated in FIG. 1. In one embodiment, each user, when using the hosting service is typically using at least one app/game server 321-325. For the sake of simplicity of explanation, we shall assume a given user is using app/game server 321, but multiple servers could be used by one user, and multiple users could share a single app/game server 321-325. The user's control input, sent from client 115 as previously described is received as inbound Internet traffic 301, and is routed through inbound routing 302 to app/game server 321. App/game server 321 uses the user's control input as control input to the game or application running on the server, and computes the next frame of video and the audio associated with it. App/game server 321 then outputs the uncompressed video/audio 329 to shared video compression 330. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 330 compresses the uncompressed video and audio from the app/game servers 321-325. The compression maybe implemented entirely in hardware, or in hardware running software. There may a dedicated compressor for each app/game server 321-325, or if the compressors are fast enough, a given compressor can be used to compress the video/audio from more than one app/game server 321-325. For example, at 60 fps a video frame time is 16.67 ms. If a compressor is able to compress a frame in 1 ms, then that compressor could be used to compress the video/audio from as many as 16 app/game servers 321-325 by taking input from one server after another, with the compressor saving the state of each video/audio compression process and switching context as it cycles amongst the video/audio streams from the servers. This results in substantial cost savings in compression hardware. Since different servers will be completing frames at different times, in one embodiment, the compressor resources are in a shared pool 330 with shared storage means (e.g., RAM, Flash) for storing the state of each compression process, and when a server 321-325 frame is complete and ready to be compressed, a control means determines which compression resource is available at that time, provides the compression resource with the state of the server's compression process and the frame of uncompressed video/audio to compress.

Note that part of the state for each server's compression process includes information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state also includes communication channel state information regarding the peak data rate and whether a previous frame is currently being output (and as result the current frame should be ignored), and potentially whether there are channel characteristics which should be considered in the compression, such as excessive packet loss, which affect decisions for the compression (e.g., in terms of the frequency of I tiles, etc). As the peak data rate or other channel characteristics change over time, as determined by an app/game server 321-325 supporting each user monitoring data sent from the client 115, the app/game server 321-325 sends the relevant information to the shared hardware compression 330.

The shared hardware compression 330 also packetizes the compressed video/audio using means such as those previously described, and if appropriate, applying FEC codes, duplicating certain data, or taking other steps to as to adequately ensure the ability of the video/audio data stream to be received by the client 115 and decompressed with as high a quality and reliability as feasible.

Some applications, such as those described below, require the video/audio output of a given app/game server 321-325 to be available at multiple resolutions (or in other multiple formats) simultaneously. If the app/game server 321-325 so notifies the shared hardware compression 330 resource, then the uncompressed video audio 329 of that app/game server 321-325 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 339 of all of the various resolutions and formats required for a given app/game server 321-325 (be it one or many) will be output at once to outbound routing 340. In one embodiment the output of the compressed video/audio 339 is in UDP format, so it is a unidirectional stream of packets.

The outbound routing network 340 comprises a series of routing servers and switches which direct each compressed video/audio stream to the intended user(s) or other destinations through outbound Internet traffic 399 interface (which typically would connect to a fiber interface to the Internet) and/or back to the delay buffer 315, and/or back to the inbound routing 302, and/or out through a private network (not shown) for video distribution. Note that (as described below) the outbound routing 340 may output a given video/audio stream to multiple destinations at once. In one embodiment this is implemented using Internet Protocol (IP) multicast in which a given UDP stream intended to be streamed to multiple destinations at once is broadcasted, and the broadcast is repeated by the routing servers and switches in the outbound routing 340. The multiple destinations of the broadcast may be to multiple users' clients 115 via the Internet, to multiple app/game servers 321-325 via inbound routing 302, and/or to one or more delay buffers 315. Thus, the output of a given server 321-322 is compressed into one or multiple formats, and each compressed stream is directed to one or multiple destinations.

Further, in another embodiment, if multiple app/game servers 321-325 are used simultaneously by one user (e.g., in a parallel processing configuration to create the 3D output of a complex scene) and each server is producing part of the resulting image, the video output of multiple servers 321-325 can be combined by the shared hardware compression 330 into a combined frame, and from that point forward it is handled as described above as if it came from a single app/game server 321-325.

Note that in one embodiment, a copy (in at least the resolution or higher of video viewed by the user) of all video generated by app/game servers 321-325 is recorded in delay buffer 315 for at least some number of minutes (15 minutes in one embodiment). This allows each user to "rewind" the video from each session in order to review previous work or exploits (in the case of a game). Thus, in one embodiment, each compressed video/audio output 339 stream being routed to a user client 115 is also being multicasted to a delay buffer 315. When the video/audio is stored on a delay buffer 315, a directory on the delay buffer 315 provides a cross reference between the network address of the app/game server 321-325 that is the source of the delayed video/audio and the location on the delay buffer 1515 where the delayed video/audio can be found.

App/game servers 321-325 may not only be used for running a given application or video game for a user, but they may also be used for creating the user interface applications for the hosting service 210 that supports navigation through hosting service 210 and other features. Various exemplary user interface applications are described in the co-pending applications.

Graphics Processing in an Online Game System

For low latency applications such as video games, it is critical that graphics operations proceed as efficiently as possible. However, attempts to speed the graphics rendering process may result in undesirable visual artifacts such as "tearing" in which information from two or more different frames is shown on a display device in a single screen draw. The embodiments of the invention described below provide a variety of techniques for improving the efficiency of graphics rendering while at the same time reducing these undesirable visual artifacts.

Figure 4:
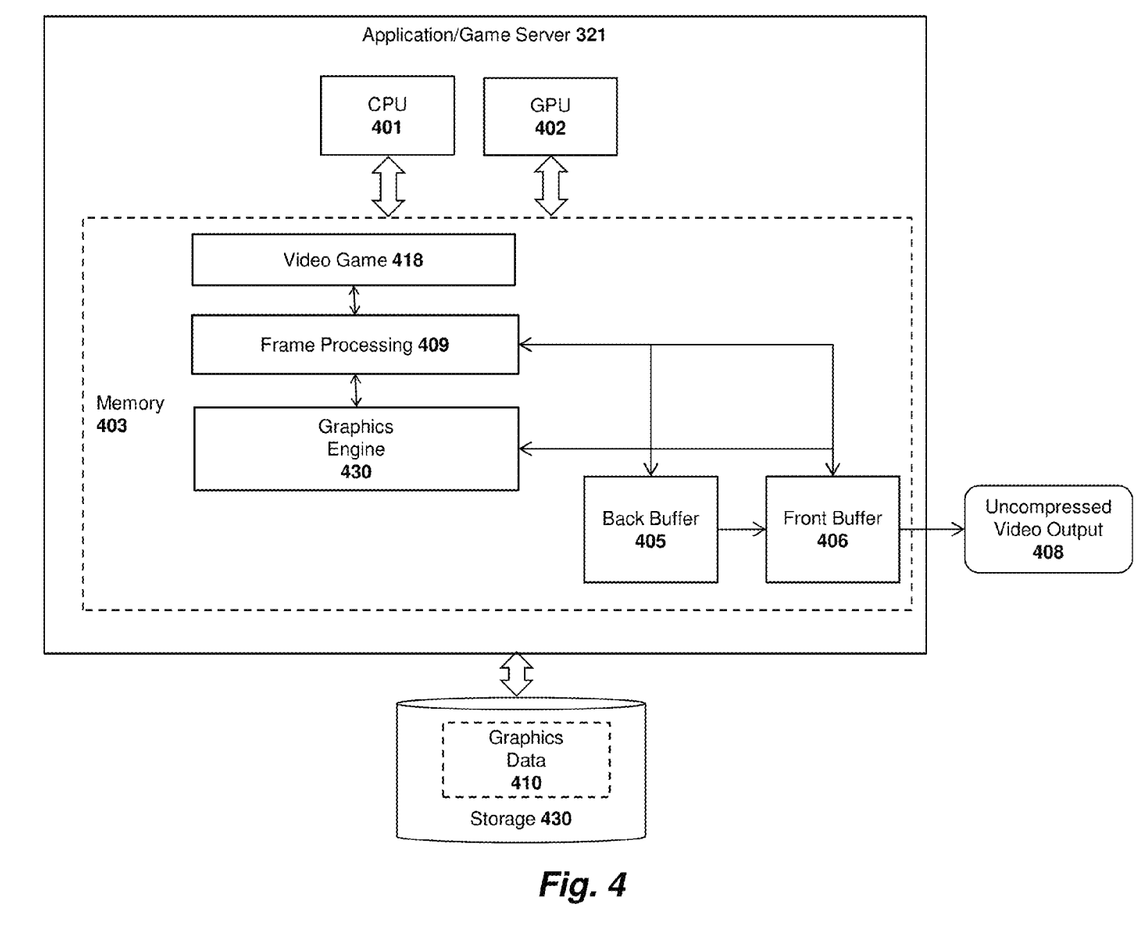
FIG. 4 illustrates a system architecture according to one embodiment of the invention.

As illustrated in FIG. 4, each application/game server 321 is equipped with a central processing unit (CPU) 401 for executing video game program code 408 stored in memory 403 and a graphics processing unit (GPU) for executing graphics commands to render the video game output 408. The architectures of the CPU and GPU are well known and, as such, a detailed description of these units and the instructions/commands executed by these units will not be provided herein. Briefly, the GPU is capable of processing a library of graphics commands as specified by one or more graphics application programming interfaces (APIs) such as Open GL or Direct 3D. The program code for executing these graphics APIs is represented in FIG. 4 as graphics engine 430. As the CPU processes the video game program code 408 it hands off graphics commands specified by the API to the GPU which executes the commands and generates the video output 409. It should be noted, however, that the underlying principles of the invention are not limited to any particular graphics standard.

In one embodiment, a frame processing module 409 performs the various frame processing techniques described herein and interfaces with both the video game program code 408 and the graphics engine 430. In one embodiment, the frame processing module 409 intercepts graphics commands generated by the video game, processes those commands in one or more ways (as described herein), and/or forwards the graphics commands to the graphics engine 430.

As illustrated in FIG. 4, one embodiment of the invention includes a back buffer 405 and a front buffer 406 for storing video game image frames generated by the graphics engine 430 as the user plays a video game. Each "frame" is comprised of a set of pixel data representing one screen image of the video game. In operation, each frame is created in the back buffer as graphics commands are executed using graphics data. When a frame has been completed in the back buffer, it is transferred to the front buffer 406 from where it is scanned out line by line to create the uncompressed video output 408. The scan-out process may occur at a predetermined standard frequency (e.g., such as 60 Hz or 120 Hz as implemented on standard CRT or LCD monitors). The uncompressed video output 408 may then be compressed using the various advanced low latency video compression techniques such as described in the co-pending applications.

As the video game is executed, various types of graphics data 410 may be retrieved as needed from a non-volatile storage device 431 such as a hard drive or flash memory. The graphics data may include, for example, texture data, vertex data, shader data, and/or other types of known graphics data for performing 3D or 2D graphics operations.

Figure 5:
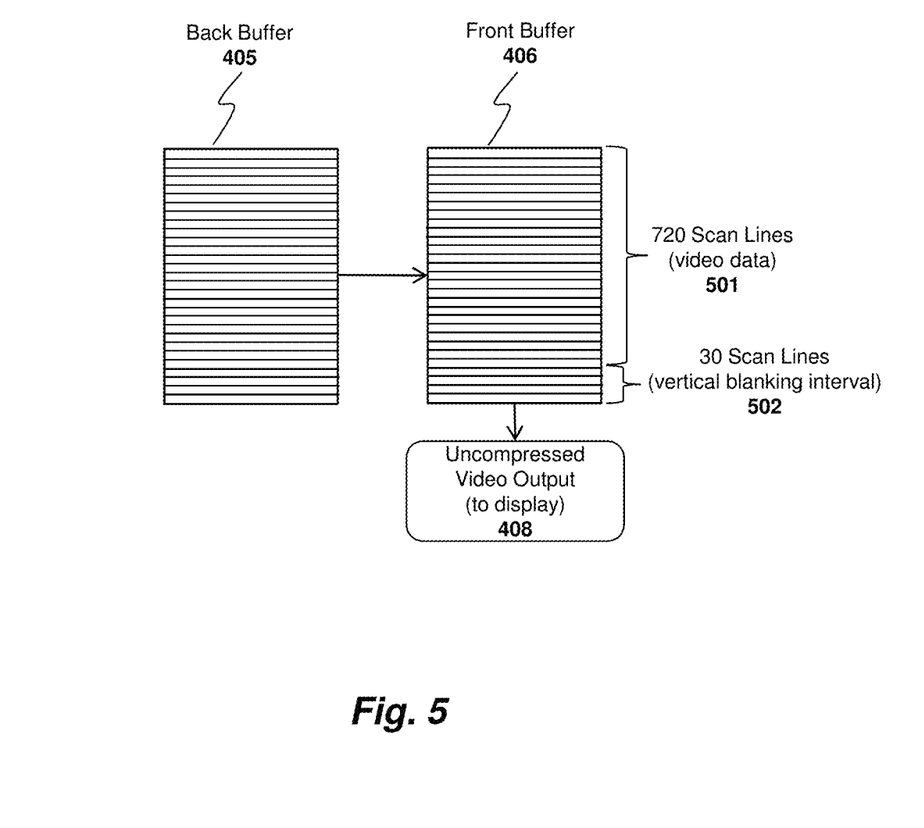
FIG. 5 illustrates a back buffer and a front buffer used by a graphics processor and central processing unit in one embodiment of the invention.

As illustrated in FIG. 5, in one embodiment, the graphics data stored in the back buffer 405 and front buffer 406 comprises a plurality of scan lines, some of which contain video data (i.e., data representing the luminance and chrominance values for each pixel to be rendered on the user's display) and some of which are reserved for the vertical blanking interval (VBI) 502. As is known by those of skill in the art, the VBI, also known as the "vertical interval" or VBLANK, is the time difference between the last line of video data for one frame on a raster display and the beginning of the first line of the next frame. VBI was originally used for timing in raster cathode ray tube displays (e.g., TVs) in which an electron beam is blanked to avoid displaying the retrace line. However, it is still used today for VGA, DVI, HDMI and other video signals. In a typical "720p" implementation such as shown in FIG. 5, 720 scan lines store pixel data and 30 scan lines are reserved for the VBI. As discussed below, the timing of the VBI may be manipulated to reduce unwanted visual artifacts within the uncompressed video output 408.

Each new video frame is constructed within the back buffer 405 as the GPU executes graphics commands and transferred to the front buffer 406 when completed. Artifacts such as "tearing" may result if the image in the back buffer is copied to the front buffer before the image in the front buffer is completely scanned out. For example, if the current scan line being read out from the front buffer 406 is line 400 when a "present" command is executed by the GPU (a "present" command, sometimes referred to as a "draw" command, causes the image in the back buffer to be copied to the front buffer 406 for presentation on a display), then scan lines 501 and above will include video data from the new frame, while scan lines 1-400 will include video data from the prior frame. Consequently, if the camera is panning or if objects in the video are moving, the bottom portion of the image and top portion of the image may appear disconnected (i.e., torn apart) from one another.

Thus, to ensure that tearing does not occur, the GPU may wait until all of the image data is scanned out from the front buffer before copying the next frame from the back buffer (i.e., wait until the scan out timing has reached the VBI). The advantage to this technique is that a perfectly completed frame is always displayed. This, however, will result in a delay which may be impractical—particularly in a low latency environment, such as needed to implement the online video game system described herein. For example, with one back buffer and one front buffer, if the VBI is completed just before the next frame is ready to be read from the back buffer, with a refresh frequency of 60 Hz, it will take approximately 16.6 ms to return to the next VBI, and the CPU and GPU will stall.

Figure 6:
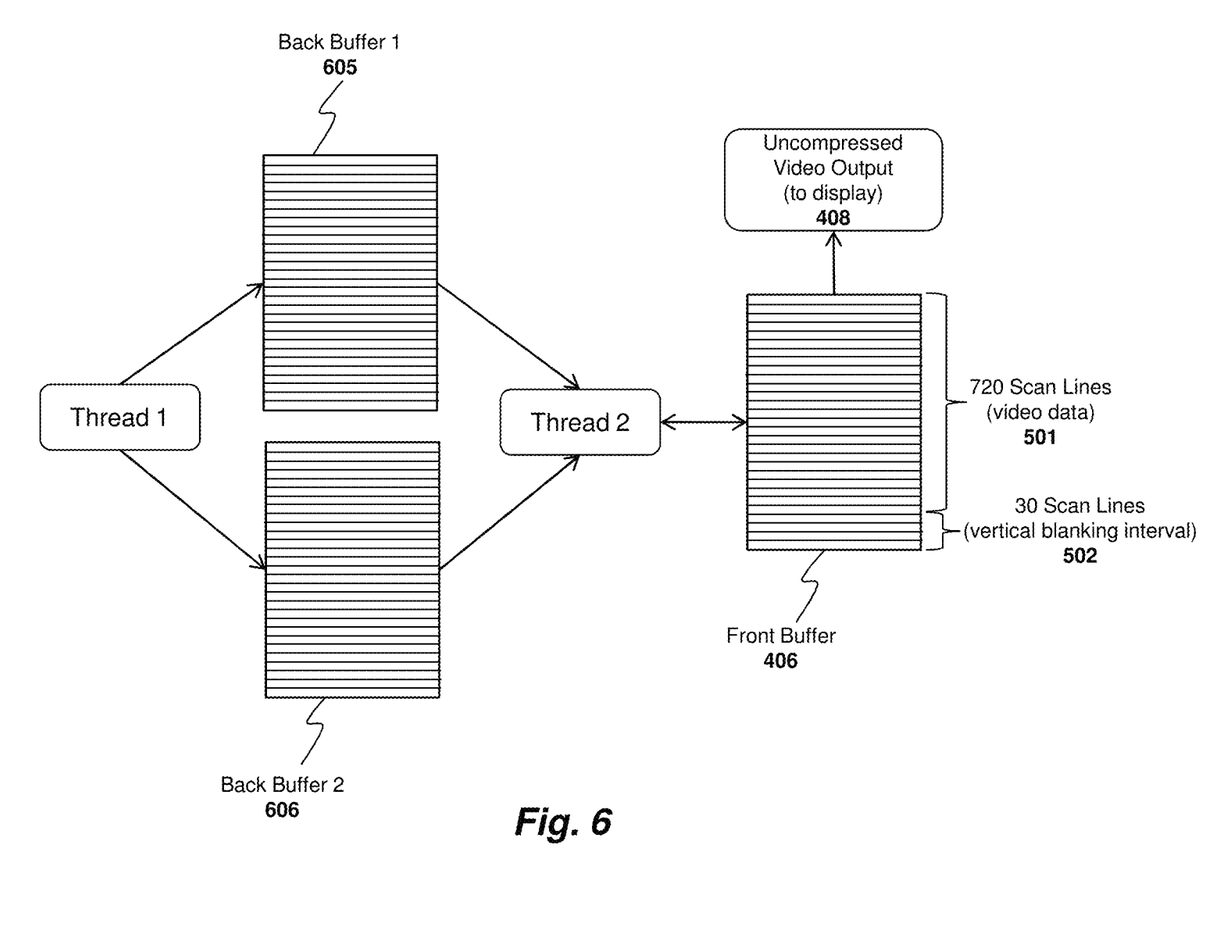
FIG. 6 illustrates two threads moving data to and from a back buffer and a front buffer in accordance with one embodiment of the invention.

As illustrated in FIG. 6, double buffering techniques may be employed to reduce the probability of the CPU/GPU stalling. In this embodiment, a first thread ("thread 1") continues to process new frames, alternating between back buffers 1 605 and 2 606 and a second thread ("thread 2") wakes up when the scan-out process has reached the VBI and/or a specified region outside of the center of the display (as described below with respect to FIG. 7b) and reads the most recently completed frame from either back buffer 1 or back buffer 2. In yet another embodiment, a third back buffer (not shown) may be implemented to further improve performance. Any of these embodiments may result in frames being skipped if necessary. For example, if video data for frame 13 is fully scanned out of the front buffer by the time both frames 14 and 15 are completed in the two back buffers, then the frame processing module 409 may copy frame 15 to the front buffer in response to a "present" or "draw" operation and skip frame 14.

While the above implementations may reduce the likelihood of stalling, they do not fully address the latency issue. For example, regardless of how many back buffers are used, thread 2 must wait for the VBI to copy a completed frame from the back buffer to the front buffer to ensure that tearing does not occur.

Consequently, to improve latency, one embodiment of the frame processing module 409 illustrated in FIG. 4 permits a new frame to be presented to the front buffer prior to the VBI (e.g., by turning off VSYNC) but employs techniques to reduce unwanted visual artifacts. In this embodiment, instead of doing a sharp transition between the two frames, the frame processing module 409 performs image processing techniques in the region of the frame susceptible to tearing (or other undesirable visual artifacts) to improve the visual appearance of the transition between the two frames. For example, in one embodiment, mixing operation such as a cross-fade (sometimes referred to as a "dissolve" transition) is implemented to transition from the current frame to the next frame. Alternatively, in one embodiment a blend operation (e.g., an alpha blend) is performed. In one embodiment, the image processing techniques are not employed to the entire frame but only to a region of scan lines above and below the current scan line (i.e., the scan line separating the current and next frames). In one embodiment, a quad is drawn across this region using a shader that performs the cross-fade operation. Alternatively, a full frame cross fade may be performed (i.e., a 50/50 cross-fade) between the two frames. Various alternative mixing image techniques may be employed while still complying with the underlying principles of the invention. In one embodiment, a noisy cross fade may be implemented instead of an alpha cross fade.

In one embodiment, the image mixing techniques described above are employed only if the scan line separating the two frames is in a specified region of the display (e.g., only towards the top or bottom of the frame where the transition will not be as noticeable). In one embodiment, if the scan line separating the frames is currently in the middle region of the display, then the frame processing module 409 will wait until the scan line leaves this region before performing the mixing operation.

Given that some graphics engines (e.g., Open GL, Direct 3D) do not include a "wait" command to cause the GPU to wait, one embodiment of the frame processing module 409 provides the GPU with "busy work" in order to wait for the scan line being read from the front buffer to reach a certain distance from the center scan line of the frame and/or to wait for the VBI. In one embodiment, the busy work comprises a series of invisible triangles or other operations which will not impact the visual display of the frame. In one embodiment, the busy work comprises a series of vertical quads which miss all of the pixel centers (if it misses pixel centers, it will not be drawn). In yet another embodiment, the busy work comprises a series of long polygons with long shaders that do a lot of trivial math which will have no impact on the visual characteristics of the frame. Of course, the underlying principles of the invention are not limited to any particular form of busy work. However, one key for selecting busy work is that it must be of a type which will not be identified a "no-op" by the GPU (which would not result in the GPU waiting to perform the work).

In one embodiment, the frame processing module 409 detects the amount of time required before the current scan line is outside of a specified center region of the frame, and selects a particular amount of busy work to fill in this time period. Various object processing benchmarks may be calculated (either dynamically or prior to runtime), to determine the amount of time which will be consumed by the busy work. For example, invisible triangles may be selected which take time T to complete. Thus, in order to ensure that the current scan line being read from the front buffer will be outside of the designated center region of the frame (or, in one embodiment, within the VBI), the frame processing module 409 may (1) calculate the number or scan lines needed to reach the edge of this region, (2) determine the time needed to wait based on the number of scan lines (i.e., based on the scan-out frequency), and (3) determine how many operations (e.g., invisible triangles) will be needed to provide busy work to the GPU during this time period. This may be accomplished, for example, by performing a calculation such as $xT=y$ where y is the amount of time needed to wait, T is the amount of time per operation (e.g., one invisible triangle) and x is the number of the particular operations which must be performed (e.g., the number of invisible triangles).

Figure 7A:
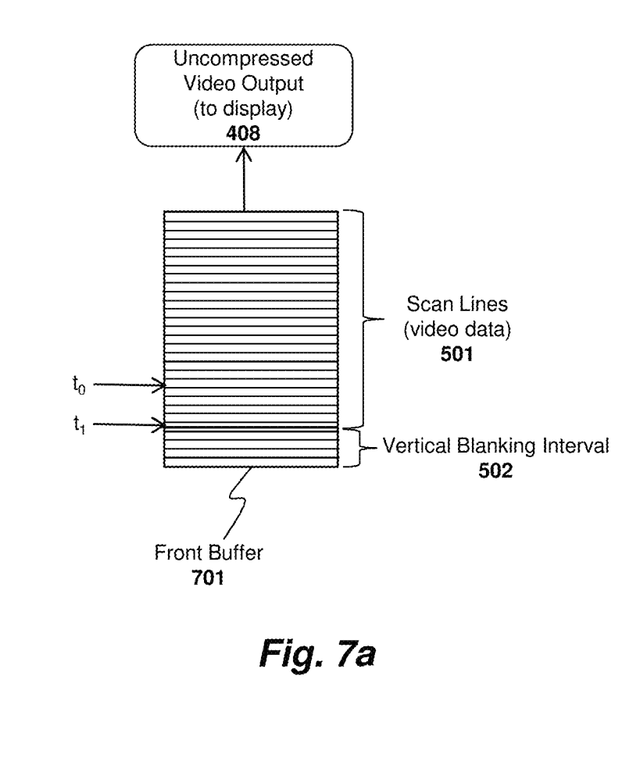
FIGS. 7a-b illustrate timing techniques associated with copying images from a back buffer to a front buffer in one embodiment of the invention.

One embodiment of the invention attempts to ensure that a "present" operation only occurs when the current scan line being read is within the VBI. By way of illustration, if the current scan line is being read from the front buffer 701 in FIG. 7a at time t0, and t1 is a time at which the VBI will be reached in the future, then the amount of time that the frame processing module 409 must wait to reach the VBI (and start reading in the new frame) is $t1-t0$. As such, the frame processing module 409 may perform the calculation $xT=t1-t0$ to determine the number of a designated type of operation that must be performed (e.g., the number of invisible triangles).

Figure 7B:
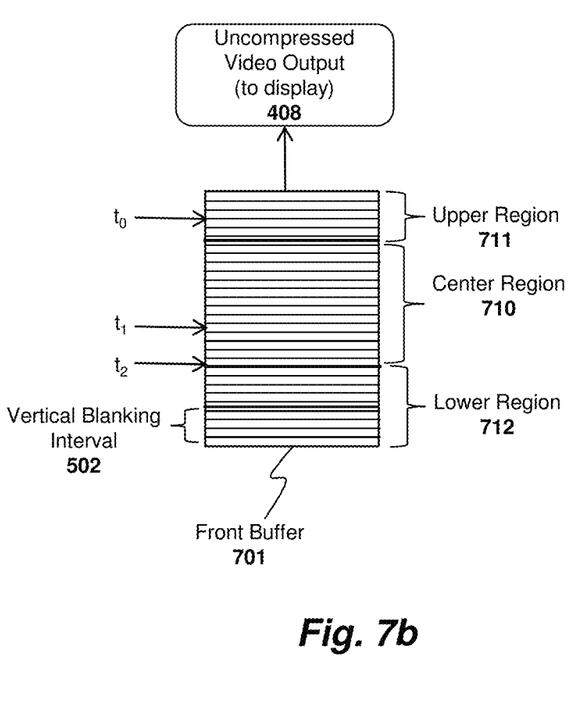

In another embodiment illustrated in FIG. 7b, the frame processing module 409 does not wait for the VBI but instead waits until the current scan line being read from the front buffer is outside of a specified center region of the display 701—e.g., in upper region 711 or lower region 712 where visual distortion will not be as noticeable. Note that the lower region 712 in this example includes the VBI. If the current scan line is being output from the front buffer 701 in FIG. 7b at time to when a present operation is ready to occur (i.e., when a frame is completed in the back buffer) then the frame processing module 409 will allow the operation to proceed because time t0 is within the upper region 711 (i.e., and therefore will not be as noticeable). However, if the current scan line is being output from the front buffer within the center region 710, such as at time t1, then in one embodiment, the frame processing module 409 will provide busy work to the GPU to delay the present operation until the lower region is reached—e.g., at time t2 (where the operation will not be s noticeable). As discussed above, the frame processing module 409 may perform the calculation $xT=t2-t1$ to determine the number of a designated type of operation that must be performed (e.g., the number of invisible triangles that must be drawn to reach the lower region at time t2).

One embodiment of the invention determines the amount of work remaining in the GPU command queue while performing the above calculations. For example, if a "present" operation is ready at time t0 in FIG. 7b, but the CPU's command queue still includes one or more operations which would delay the actual execution of the present operation until the current scan line being read is within center region 710, then the frame processing module 409 may insert busy work into the CPU's command queue to ensure that the present operation does not occur until the lower region 712 has been reached. The frame processing module 409 may determine the amount of work remaining in the CPU's command queue using the real time GPU profiling techniques described below.

Figure 8:
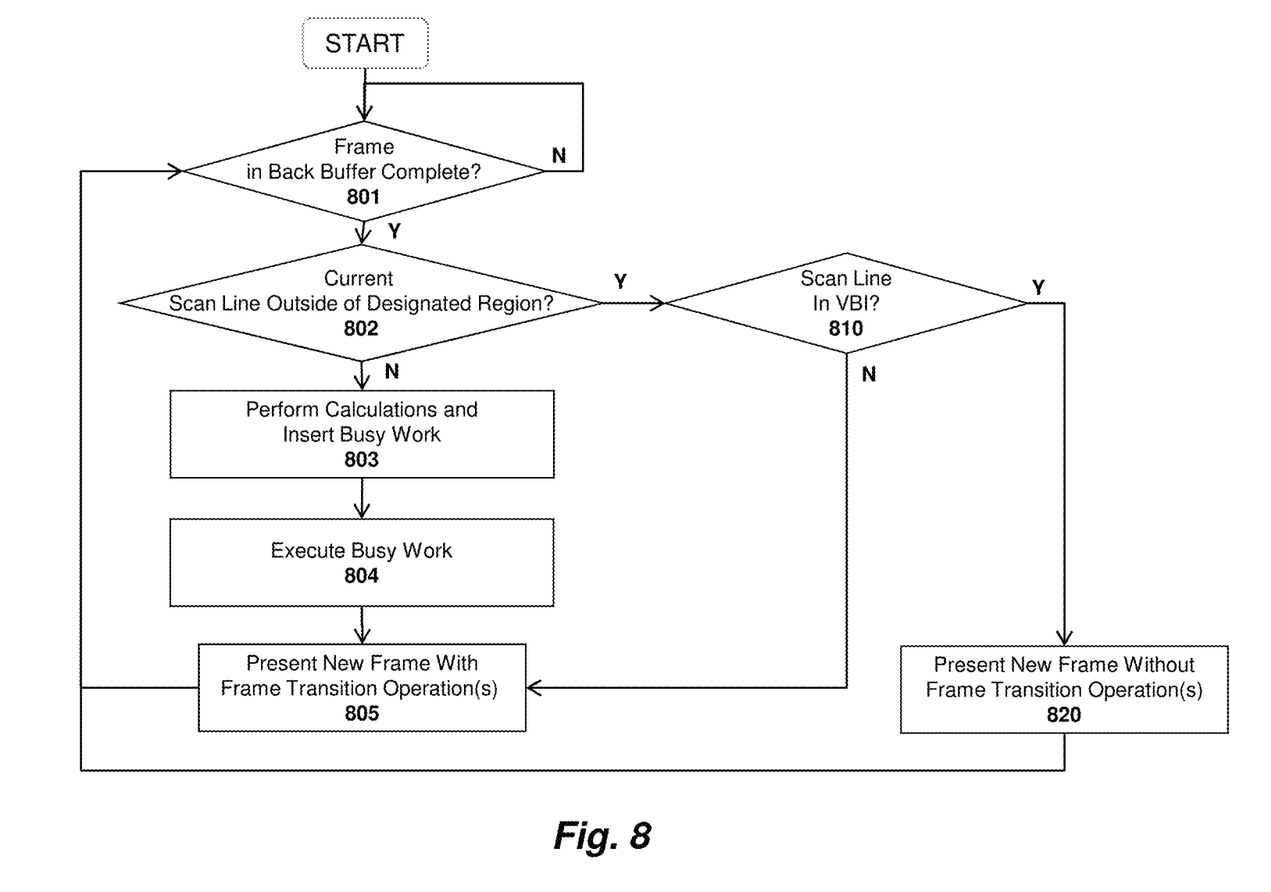
FIG. 8 illustrates one embodiment of a method for copying images from a back buffer to a front buffer.

One embodiment of a method which combines several of the techniques described above is illustrated in FIG. 8. Note, however, that some of the specific operations illustrated in FIG. 8 are not required for complying with the underlying principles of the invention.

At 801, a determination is made as to whether a frame in one of the back buffers is complete. If so, then at 802 a determination is made as to whether the current scan line (i.e., the current scan line being read out from the front buffer to be displayed) is outside of a specified region. In one embodiment, this is a designated region in the center of the display such as 710 illustrated in FIG. 7b. If so, then at 810 a determination is made as to whether the current scan line is within the VBI. If so, then at 820, the new frame is presented (e.g., copied from the back buffer to the front buffer) without performing frame transition operation(s) (i.e., because frame transition operations are not required to ensure a smooth transition if the current scan line is within the VBI).

Returning to 802, if a determination is made that the current scan line is within the designated region (and/or if the current scan line will be in the designated region by the time the GPU is capable of executing the present operation), then at 803 busy work is provided to the GPU (e.g., inserted in the CPU's command queue). As mentioned above, various different types of operations may be provided to the GPU which will not affect the resulting video image (e.g., invisible triangles, a vertical quad which misses all of the pixel centers, etc). The number of inserted operations are based on the time needed to reach the boundary of the designated region and the time required to perform each operation (as described above). At 804 the GPU executes the busy work and, at 805, when the busy work has been completed and the current scan line is outside of the designated region, the new frame is presented at 805 (i.e., copied from the back buffer to the font buffer). As discussed above, in one embodiment, the presentation may include performing a frame transition operation to smooth the transition between the two frames.

One embodiment of the invention increases the size of the VBI within the front buffer to decrease the likelihood of unwanted visual artifacts such as tearing. To increase the VBI, the frame processing module 409 may increase the rate at which video data is scanned out from the front buffer 406. For example, if it takes 16 ms to scan out a complete frame from the front buffer (including the VBI), and if all of the video data is transferred in the first 8 ms of the scanout process, then the remaining 8 ms will effectively be a VBI interval (i.e., effectively making the VBI half of the front buffer). Thus, a present operation may occur within the second 8 ms without unwanted visual artifacts. Of course, various additional time periods may be specified. For example, if clock frequencies allow, the video data may be read out in the first 1 ms and the remainder of the front buffer may be reserved for the VBI. The underlying principles of the invention are not limited to any particular set of scanning timings.

In one embodiment, the scan out process is executed at a 120 Hz timing frequency (rather than a 60 Hz frequency). In this embodiment, the video data scanout takes approximately 8 ms and the VBI is approximately 0.3 ms. One advantage of using a 120 Hz timing frequency is that it is a standard timing which existing graphics chips are capable of implementing.

One embodiment of the invention implements a front buffer which is larger than the back buffer. For example in "double high" configuration, the front buffer is 2× the size of the back buffer (e.g., instead of 720 scan lines of video+30 scan lines for VBI, the front buffer is 1440 scan lines of video+60 scan lines of VBI). As long as the scan line currently being read out from the front buffer is within the bottom half of the front buffer when a present operation occurs, no unwanted visual artifacts will occur. The same techniques as those described above may be employed to ensure that the present or draw operation always occurs when the current scan line is within the lower portion of the front buffer.

In one embodiment, the frame processing module 409 performs dynamic, real time profiling of the GPU 402 to determine how quickly the GPU is performing graphics operations and uses this information to estimate the various time periods specified above (e.g., the amount of time remaining in the CPU's command queue and the amount of time consumed by "busy work" operations). In this embodiment, the frame processing module 409 may track the current mode of the GPU—e.g., all of the different features that are currently turned on within the GPU. The GPU mode information may be extracted from a specified set of the CPU's control registers. In one embodiment, a hash value is generated based on the information extracted from the control registers and different hash values are then used to identify the different GPU "modes" of operation (e.g., "Mode 36"). Once a mode is identified, the frame processing module tracks how long it takes the GPU to execute certain types of operations while in that mode of operation (e.g., how long it takes the GPU to render objects of a certain type while in a particular mode, such as the invisible triangles discussed above). The frame processing module 409 then updates a table indexed by the different hash values associated with the different GPU modes of operation and stores values representing the amount of time needed for each specified type of operation (e.g., in Mode 36, each triangle may take 0.005 ms to render).

In one embodiment, the frame processing module 409 inserts timestamp fences around work being inserted into the GPU command queue, determines the amount of time consumed performing the work based on the differences between the timestamps, and continually updates the hash table to include an average per-operation time. For example, if in "Mode 36", rendering 343 triangles took 2 ms, then the average time per triangle is 0.0058 ms per triangle for Mode 36. This average per-triangle time is then added to the benchmark database for Mode 36. In one embodiment, frame processing module 409 continually updates the benchmark database for different GPU modes and different specified types of operations. Examples of modes for which timing information may be collected include, but are not limited to, depth-only rendering; lighting; alpha blending; and image processing. The frame processing module 409 subsequently queries the benchmark database to determine the amount of GPU work remaining in the command queue, and/or the number of busy work operations needed to reach a specified scan out region (e.g., the VBI or region outside of the center region as discussed above).

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, input devices, have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed is:

1. A system for graphics processing comprising:
a central processing unit to process application/video game program code and a graphics processing unit (GPU) to process graphics commands and generate a series of video frames for the application/video game;
one or more back buffers to store video frames as the video frames are being created in response to the execution of the graphics commands;
a front buffer to receive a video frame for rendering on a display after the video frame has been completed in one of the one or more back buffers, the front buffer outputting the video frame for display one scan line at a time at a designated scan out frequency, a subset of scan lines stored in the front buffer being associated with a vertical blanking interval (VBI); and
a frame processing module to begin copying a newly completed frame from the back buffer to the front buffer before the video data for a prior video frame stored in the front buffer has been fully scanned out.

2. The system as in claim 1 wherein the frame processing module comprises program code for performing the additional operations of:
determining the most recent scan line output from the front buffer; and
copying the completed video frame from the back buffer to the front buffer only if the most recent scan line output from the front buffer is outside of a designated center region of the video frame.

3. The system as in claim 1 wherein the frame processing module comprises program code for performing the additional operations of:
executing a video frame mixing operation to combine the newly completed frame with the prior video frame in the front buffer.

4. The system as in claim 3 wherein the mixing operation comprises a cross-fade operation.

5. The system as in claim 3 wherein the mixing operation is a blend operation.

6. The system as in claim 2 wherein, if the current scan line is within the designated center region of the display, the frame processing module waits a period of time until the current scan line has moved outside of the designated center region before copying the newly completed frame from the back buffer to the front buffer.

7. The system as in claim 6 wherein the frame processing module comprises program code for performing the additional operations of:
inserting busy work into a command queue of the GPU based on the period of time to be waited, the amount of busy work approximating the period of time.

8. The system as in claim 7 wherein the busy work comprises a plurality of operations which have no effect on the visual appearance of the frame in the front buffer.

9. The system as in claim 8 wherein the busy work comprises a plurality of invisible triangles.

10. The system as in claim 8 wherein the busy work comprises a series of vertical quads which miss all of the pixel centers.

11. The system as in claim 8 wherein the busy work comprises a series of long polygons with long shaders that perform trivial math.

12. A system for graphics processing comprising:
a central processing unit to process application/video game program code and a graphics processing unit (GPU) to process graphics commands and generate a series of video frames for the application/video game;
one or more back buffers to store video frames as the video frames are being created in response to the execution of the graphics commands;
a front buffer to receive a video frame for rendering on a display after the video frame has been completed in one of the one or more back buffers, the front buffer outputting the video frame for display one scan line at a time at a designated scan out frequency, a subset of scan lines stored in the front buffer being associated with an interval;
a frame processing module to perform the operations of:
determining a most recent scan line output from the front buffer;
in response to a new frame being completed in one of the back buffers, determining an amount of work remaining in a GPU command queue and, if the amount of work remaining in the command queue would cause the newly completed frame from the back buffer to be copied to the front buffer while a current scan line being output from the front buffer is outside of a designated region of the video frame, then inserting an operation in the command queue, the operation to cause the new frame in the back buffer to be transferred to the front buffer after the work remaining in the command queue is completed.

13. The system as in claim 12 wherein, if the amount of work remaining in the command queue would cause the newly completed frame from the back buffer to be copied to the front buffer while a current scan line being output from the front buffer is within the designated region of the video frame, then submitting busy work to the command queue to ensure that the newly completed frame from the back buffer will be copied to the front buffer while a current scan line being output from the front buffer is outside of the designated region.

14. The system as in claim 12 wherein the interval comprises a vertical blanking interval and wherein the designated region comprises all of the front buffer except for the region occupied by the vertical blanking interval.

15. The system as in claim 12 wherein a first thread creates new frames within the one or more back buffers and a second thread determines a most recent frame output from the front buffer and executes the operation to cause the new frame in the back buffer to be transferred to the front buffer after the work remaining in the command queue is completed.

16. The system as in claim 12 wherein the frame processing module comprises program code for performing the additional operations of:
    executing a video frame mixing operation to combine the newly completed frame with the prior video frame in the front buffer.

17. The system as in claim 16 wherein the mixing operation comprises a cross-fade operation.

18. The system as in claim 16 wherein the mixing operation is a blend operation.

19. The system as in claim 13 wherein the busy work comprises a plurality of operations which have no effect on the visual appearance of the frame in the front buffer.

20. The system as in claim 19 wherein the busy work comprises a plurality of invisible triangles.

21. The system as in claim 19 wherein the busy work comprises a series of vertical quads which miss all of the pixel centers.

22. The system as in claim 19 wherein the busy work comprises a series of long polygons with long shaders that perform trivial math.

23. A system for graphics processing comprising:
    a central processing unit to process application/video game program code and a graphics processing unit (GPU) to process graphics commands and generate a series of video frames for the application/video game;
    one or more back buffers to store video frames as the video frames are being created in response to the execution of the graphics commands;
    a front buffer to receive a video frame for rendering on a display after the video frame has been completed in one of the one or more back buffers, the front buffer outputting the video frame for display one scan line at a time at a designated scan out frequency, a subset of scan lines stored in the front buffer being associated with an interval; and
    a frame processing module to increase the number of scan lines associated with the interval relative to the number of scan lines not associated with the interval to increase the likelihood that a new frame will be completed in a back buffer and ready for transfer to the front buffer at a time when the subset of scan lines stored in the front buffer being associated with the interval is processed.

24. The system as in claim 23 wherein increasing the number of scan lines associated with the interval relative to the number of scan lines not associated with the interval comprises configuring the front buffer to have a larger size than the size of the back buffer.

25. The system as in claim 24 wherein the front buffer is configured to be two times the size of the back buffer.

26. The system as in claim 23 wherein in response to detecting a draw operation which will cause the new frame in the back buffer to be transferred to the front buffer, the frame processing module determines an amount of work remaining in a GPU command queue and, if the amount of work remaining in the command queue would cause the newly completed frame from the back buffer to be copied to the front buffer while a current scan line being output from the front buffer is outside of the interval, then, then inserting the draw operation in the command queue.

27. The system as in claim 26 wherein, in response to detecting a draw operation which will cause the new frame in the back buffer to be transferred to the front buffer, the frame processing module determines whether the amount of work remaining in the command queue would cause the newly completed frame from the back buffer to be copied to the front buffer while a current scan line being output from the front buffer is outside of the interval, then the frame processing module submits busy work to the command queue to ensure that the newly completed frame from the back buffer will be copied to the front buffer while a current scan line being output from the front buffer is within the interval.

28. The system as in claim 23 wherein a first thread creates new frames within the one or more back buffers and a second thread determines a most recent frame output from the front buffer and executes a draw operation to cause the new frame in the back buffer to be transferred to the front buffer after the current work remaining in the command queue is completed.

29. The system as in claim 27 wherein the busy work comprises a plurality of operations which have no effect on the visual appearance of the frame in the front buffer.

30. The system as in claim 29 wherein the busy work comprises a plurality of invisible triangles.

31. The system as in claim 29 wherein the busy work comprises a series of vertical quads which miss all of the pixel centers.

32. The system as in claim 29 wherein the busy work comprises a series of long polygons with long shaders that perform trivial math.

* * * * *